US 8,751,950 B2

(12) United States Patent
Loberg

(10) Patent No.: US 8,751,950 B2
(45) Date of Patent: Jun. 10, 2014

(54) CAPTURING A USER'S INTENT IN DESIGN SOFTWARE

(75) Inventor: Barrie Arnold Loberg, Calgary (CA)

(73) Assignee: Ice Edge Business Solutions Ltd., Calgary (CA)

( * ) Notice: Subject to any disclaimer, the term of this patent is extended or adjusted under 35 U.S.C. 154(b) by 569 days.

(21) Appl. No.: 11/204,421

(22) Filed: Aug. 16, 2005

(65) Prior Publication Data

US 2006/0041842 A1  Feb. 23, 2006

Related U.S. Application Data

(60) Provisional application No. 60/602,233, filed on Aug. 17, 2004.

(51) Int. Cl.
  *G06F 3/048* (2013.01)

(52) U.S. Cl.
  USPC ........... 715/771; 715/765; 715/775; 715/782; 715/793; 715/798; 715/800; 715/835; 715/850; 715/852

(58) Field of Classification Search
  USPC ......... 715/964, 765, 771, 775, 782, 793, 798, 715/800, 835, 850, 852
  See application file for complete search history.

(56) References Cited

U.S. PATENT DOCUMENTS

| | | | |
|---|---|---|---|
| 5,111,392 A | | 5/1992 | Malin |
| 5,255,207 A | | 10/1993 | Cornwell |
| 5,293,479 A | | 3/1994 | Quintero et al. |
| 5,514,232 A | | 5/1996 | Burns |
| 5,555,357 A | * | 9/1996 | Fernandes et al. ............ 345/441 |
| 5,572,639 A | | 11/1996 | Gantt |
| 5,576,965 A | * | 11/1996 | Akasaka et al. ................ 700/97 |
| 5,588,098 A | * | 12/1996 | Chen et al. .................... 345/653 |
| 5,625,827 A | * | 4/1997 | Krause et al. ................. 715/234 |
| 5,684,713 A | | 11/1997 | Asada et al. |
| 5,740,341 A | * | 4/1998 | Oota et al. .................... 345/420 |

(Continued)

FOREIGN PATENT DOCUMENTS

| | | |
|---|---|---|
| EP | 1098244 | 9/2001 |
| EP | 1098244 A2 | 9/2001 |

(Continued)

OTHER PUBLICATIONS bing search q=design+resolve+conflict+suggest&qs Mar. 10, 2014.*

(Continued)

*Primary Examiner* — Boris Pesin
*Assistant Examiner* — John Heffington
(74) *Attorney, Agent, or Firm* — Workman Nydegger

(57) ABSTRACT

A software program for use in designing interior and exterior spaces receives user input that is associated with one or more attributes. Subsequent user input, having other attributes, is resolved in light of the first input attributes to create a real-world depiction of design choices in real-time. For example, design choices that conflict with prior design choices are resolved (or modified as necessary) to ensure that each of the prior and present user input choices are represented in an appropriate way. The resolution by the design software is also used to create an accurate parts (and/or price) list so that when the user has completed the design of an exterior or interior space, the design can be submitted directly as an order to be fulfilled. Generally, continual resolution ensures that the user's design intent is captured in an accurate and efficient way in a user interface.

40 Claims, 5 Drawing Sheets

(56) References Cited

U.S. PATENT DOCUMENTS

| | | | |
|---|---|---|---|
| 5,764,518 A * | 6/1998 | Collins | 700/95 |
| 5,870,771 A * | 2/1999 | Oberg | 715/202 |
| 5,894,310 A * | 4/1999 | Arsenault et al. | 345/679 |
| 5,977,982 A | 11/1999 | Lauzon | |
| 5,995,107 A | 11/1999 | Berteig | |
| 6,014,503 A | 1/2000 | Nagata et al. | |
| 6,020,885 A | 2/2000 | Honda | |
| 6,037,945 A * | 3/2000 | Loveland | 345/420 |
| 6,253,167 B1 | 6/2001 | Matsuda | |
| 6,292,810 B1 * | 9/2001 | Richards | 715/201 |
| 6,401,237 B1 | 6/2002 | Ishikawa | |
| 6,459,435 B1 * | 10/2002 | Eichel | 345/588 |
| 6,466,239 B2 | 10/2002 | Ishikawa | |
| 6,493,679 B1 * | 12/2002 | Rappaport et al. | 705/29 |
| 6,509,906 B1 * | 1/2003 | Awe et al. | 345/619 |
| 6,662,144 B1 | 12/2003 | Normann et al. | |
| 6,690,981 B1 * | 2/2004 | Kawachi et al. | 700/83 |
| 6,701,288 B1 | 3/2004 | Normann | |
| 6,721,684 B1 | 4/2004 | Saebi | |
| 6,772,168 B2 | 8/2004 | Ardoin et al. | |
| 6,888,542 B1 * | 5/2005 | Clauss | 345/420 |
| 6,922,701 B1 | 7/2005 | Ananian et al. | |
| 6,971,063 B1 * | 11/2005 | Rappaport et al. | 715/733 |
| 6,985,832 B2 | 1/2006 | Saebi | |
| 6,999,102 B2 * | 2/2006 | Felser et al. | 345/619 |
| 7,019,753 B2 * | 3/2006 | Rappaport et al. | 345/582 |
| 7,042,440 B2 * | 5/2006 | Pryor et al. | 345/158 |
| 7,062,454 B1 * | 6/2006 | Giannini et al. | 705/26.81 |
| 7,062,722 B1 | 6/2006 | Carlin et al. | |
| 7,080,096 B1 | 7/2006 | Imamura | |
| 7,085,697 B1 * | 8/2006 | Rappaport et al. | 703/13 |
| 7,096,173 B1 * | 8/2006 | Rappaport et al. | 703/13 |
| 7,155,228 B2 * | 12/2006 | Rappaport et al. | 455/446 |
| 7,171,208 B2 * | 1/2007 | Rappaport et al. | 455/445 |
| 7,200,639 B1 | 4/2007 | Yoshida | |
| 7,216,092 B1 * | 5/2007 | Weber et al. | 705/26.5 |
| 7,243,054 B2 * | 7/2007 | Rappaport et al. | 703/2 |
| 7,246,044 B2 * | 7/2007 | Imamura et al. | 703/1 |
| 7,246,045 B1 * | 7/2007 | Rappaport et al. | 703/2 |
| 7,249,005 B2 | 7/2007 | Loberg | |
| 7,266,768 B2 * | 9/2007 | Ferlitsch et al. | 715/273 |
| 7,277,572 B2 * | 10/2007 | MacInnes et al. | 382/154 |
| 7,277,830 B2 | 10/2007 | Loberg | |
| 7,299,168 B2 * | 11/2007 | Rappaport et al. | 703/20 |
| 7,299,416 B2 * | 11/2007 | Jaeger | 715/716 |
| 7,328,171 B2 * | 2/2008 | Helot et al. | 705/27.2 |
| 7,340,383 B2 | 3/2008 | Mayuzumi | |
| 7,353,192 B1 | 4/2008 | Ellis | |
| 7,587,302 B2 | 9/2009 | Arvin | |
| 7,596,518 B2 * | 9/2009 | Rappaport et al. | 705/29 |
| 7,643,966 B2 | 1/2010 | Adachi | |
| 7,661,959 B2 * | 2/2010 | Green et al. | 434/75 |
| 7,676,348 B2 | 3/2010 | Okada | |
| 7,680,644 B2 * | 3/2010 | Rappaport et al. | 703/21 |
| 7,788,068 B2 | 8/2010 | Mangon | |
| 7,814,436 B2 | 10/2010 | Schrag | |
| 7,822,584 B1 | 10/2010 | Saebi | |
| 7,823,074 B2 | 10/2010 | Takemura | |
| 7,856,342 B1 | 12/2010 | Kfouri | |
| 7,877,237 B1 | 1/2011 | Saebi | |
| 7,996,756 B2 | 8/2011 | Eilers | |
| 8,108,267 B2 | 1/2012 | Varon | |
| 8,132,123 B2 | 3/2012 | Schrag | |
| 8,134,553 B2 | 3/2012 | Saini | |
| 8,185,219 B2 | 5/2012 | Gilbert | |
| 8,244,025 B2 | 8/2012 | Davis | |
| 8,314,799 B2 | 11/2012 | Pelletier | |
| 8,352,218 B2 | 1/2013 | Balla | |
| 8,462,147 B2 | 6/2013 | Sugden | |
| 8,499,250 B2 | 7/2013 | Wetzer | |
| 8,508,539 B2 | 8/2013 | Vlietinck | |
| 8,510,672 B2 | 8/2013 | Loberg | |
| 2001/0024211 A1 * | 9/2001 | Kudukoli et al. | 345/763 |
| 2001/0047250 A1 * | 11/2001 | Schuller et al. | 703/1 |
| 2001/0047251 A1 | 11/2001 | Kemp | |
| 2002/0010589 A1 | 1/2002 | Nashida | |
| 2002/0069221 A1 | 6/2002 | Rao | |
| 2002/0083076 A1 | 6/2002 | Wucherer | |
| 2002/0085041 A1 | 7/2002 | Ishikawa | |
| 2002/0091739 A1 * | 7/2002 | Ferlitsch et al. | 707/526 |
| 2002/0093538 A1 * | 7/2002 | Carlin | 345/778 |
| 2002/0144204 A1 | 10/2002 | Milner | |
| 2002/0188678 A1 | 12/2002 | Edecker | |
| 2002/0196285 A1 * | 12/2002 | Sojoodi et al. | 345/771 |
| 2004/0012542 A1 * | 1/2004 | Bowsher et al. | 345/10 |
| 2004/0027371 A1 * | 2/2004 | Jaeger | 345/716 |
| 2004/0098691 A1 | 5/2004 | Teig | |
| 2004/0117746 A1 * | 6/2004 | Narain et al. | 716/4 |
| 2004/0145614 A1 | 7/2004 | Takagaki et al. | |
| 2004/0153824 A1 | 8/2004 | Devarajan | |
| 2004/0204903 A1 | 10/2004 | Saebi | |
| 2004/0205519 A1 | 10/2004 | Chapel | |
| 2005/0041028 A1 | 2/2005 | Coutts | |
| 2005/0065951 A1 * | 3/2005 | Liston et al. | 707/101 |
| 2005/0071135 A1 | 3/2005 | Vredenburgh | |
| 2005/0081161 A1 * | 4/2005 | MacInnes et al. | 715/765 |
| 2006/0028695 A1 | 2/2006 | Knighton | |
| 2006/0041842 A1 | 2/2006 | Loberg | |
| 2006/0174209 A1 | 8/2006 | Barros | |
| 2006/0206623 A1 | 9/2006 | Gipps | |
| 2006/0271378 A1 | 11/2006 | Day | |
| 2007/0088704 A1 | 4/2007 | Bourne | |
| 2007/0115275 A1 | 5/2007 | Cook et al. | |
| 2007/0168325 A1 | 7/2007 | Bourne | |
| 2007/0180425 A1 | 8/2007 | Storms | |
| 2007/0188488 A1 | 8/2007 | Choi | |
| 2007/0204241 A1 | 8/2007 | Glennie et al. | |
| 2007/0219645 A1 | 9/2007 | Thomas | |
| 2007/0240049 A1 | 10/2007 | Rogerson | |
| 2007/0250295 A1 | 10/2007 | Murray | |
| 2007/0260432 A1 | 11/2007 | Okada | |
| 2007/0271870 A1 | 11/2007 | Mifsud | |
| 2007/0294622 A1 | 12/2007 | Sterner | |
| 2008/0036769 A1 | 2/2008 | Coutts | |
| 2008/0052618 A1 | 2/2008 | McMillan | |
| 2008/0143884 A1 | 6/2008 | Foster | |
| 2008/0275674 A1 | 11/2008 | Reghetti et al. | |
| 2008/0282166 A1 | 11/2008 | Fillman | |
| 2008/0303844 A1 | 12/2008 | Reghetti et al. | |
| 2008/0309678 A1 | 12/2008 | Reghetti et al. | |
| 2009/0113349 A1 | 4/2009 | Zohar | |
| 2009/0119039 A1 | 5/2009 | Banister | |
| 2009/0138826 A1 | 5/2009 | Barros | |
| 2009/0148050 A1 | 6/2009 | Reghetti et al. | |
| 2009/0210487 A1 | 8/2009 | Westerhoff et al. | |
| 2009/0248184 A1 | 10/2009 | Steingart | |
| 2009/0273598 A1 | 11/2009 | Reghetti et al. | |
| 2010/0017733 A1 | 1/2010 | Barros | |
| 2010/0121614 A1 | 5/2010 | Reghetti et al. | |
| 2010/0122196 A1 | 5/2010 | Wetzer | |
| 2010/0138762 A1 | 6/2010 | Reghetti et al. | |
| 2010/0185514 A1 | 7/2010 | Glazer | |
| 2011/0078169 A1 | 3/2011 | Sit | |
| 2011/0169826 A1 | 7/2011 | Elsberg | |
| 2011/0258573 A1 | 10/2011 | Wetzer | |
| 2011/0320966 A1 | 12/2011 | Edecker | |
| 2012/0005353 A1 | 1/2012 | Edecker | |
| 2012/0331422 A1 | 12/2012 | High | |

FOREIGN PATENT DOCUMENTS

| | | |
|---|---|---|
| JP | EP1204046 A1 | 5/2002 |
| WO | WO9003618 | 4/1990 |
| WO | WO9322741 | 11/1993 |
| WO | WO02075597 | 9/2002 |
| WO | WO2005033985 | 4/2005 |
| WO | 2006018740 | 2/2006 |
| WO | WO2006018744 | 2/2006 |
| WO | WO2007093060 | 8/2007 |
| WO | 2007106873 | 9/2007 |

OTHER PUBLICATIONS bing search q=design+space+resolve+conflict+sugg Mar. 10, 2014.*

(56) References Cited

OTHER PUBLICATIONS bing search q=design+space+resolve+conflict+suggest update Mar. 10, 2014.*
Marir F et al: "OSCONCAD: a model-based CAD system integrated with computer applications", Proceedings of the International Construction IT Conference, vol. 3, 1998.
EPO Search Report for EP07701791 dated Aug. 21, 2012.
Gross M D: "Why can't CAD be more like Lego? CKB, a program for building constructions kits", Automation in Construction, Elsevier Science Publishers, Amsterdam, NL, vol. 5, No. 4, Oct. 1, 1996 pp. 285-300, XP004072247, ISSN: 0926-5805, D0I:10.1016/S0926-5805(96)00154-9.
European Search Report—Application No./Patent No. 09719352.8-1960/2252951 PCT/CA2009000311.
Josie Wernecke; Title: The Inventor Mentor: Programming Object Oriented 3D Graphics with Open Inventor; Release 2; Date: Jun. 19, 1997; Published on Web Site: www.cs.ualberta.cal-.
Office Action Mailed Nov. 28, 2007, U.S. Appl. No. 11/204,421.
Office Action Mailed Aug. 11, 2008, U.S. Appl. No. 11/204,421.
Office Action Mailed Dec. 23, 2008, U.S. Appl. No. 11/204,421.
Office Action Mailed Mar. 31, 2009, U.S. Appl. No. 11/204,421.
Office Action Mailed May 15, 2009, U.S. Appl. No. 11/204,421.
Office Action Mailed Jul. 29, 2009, U.S. Appl. No. 11/204,421.
International Search Report and Opinion on PCT/CA2007/000241, mailed May 15, 2007.
International Search Report and Opinion on PCT/CA2009/000190, mailed Jun. 5, 2009.
International Search Report and Opinion on PCT/CA2009/000183, mailed Jun. 9, 2009.
International Search Report and Opinion on PCT/CA2009/000311, mailed Jul. 30, 2009.
Office Action Mailed Aug. 18, 2010, U.S. Appl. No. 11/577,302.
USPTO, Office Action in U.S. Appl. No. 12/444,886, mailed Oct. 27, 2011, 24 pages.
Advisory Action Mailed Mar. 31, 2009, U.S. Appl. No. 11/204,421.
Advisory Action Mailed May 15, 2009, U.S. Appl. No. 11/204,421.
USPTO, Office Action in U.S. Appl. No. 12/444,890, mailed Oct. 27, 2011, 30 pages.
International Search Report & Written Opinion for PCT/US2010/058092 dated Jul. 27, 2011.
USPTO, Office Action in U.S. Appl. No. 12/444,893, mailed Feb. 19, 2013.
USPTO, Office Action in U.S. Appl. No. 12/444,886, mailed Aug. 16, 2012.
Blythe, Rise of the Graphics Processor, IEEE, 2008.
U.S. Office of Personnel Management, Clear Cache, IE, 2007.
Wang, Intellectual Property Protection in Collaborative Design through Lean information Modeling and Sharing , 2006.
Lea, Community Place Architecture and Performance, 2007.
Autodesk, Maya 8.5 Shading, 2007.
CRC, Final Report Collaboration Platform. 2009.
Mental Images GmbH, RealityServer Functional Overview White Paper, 2007.
Rozansk, Software Systems Architecture Working With Stakeholders Using Viewpoints and Perspectives, 2008.
Sony, Community Place Conductor 2.0 Users Manual, 1998.
Vasko, Collaborative Modeling of Web Applications for Various Stakeholders, 2009.
International Search Report for PCT/CA2009000190 mailed Apr. 12, 2012.
Chan, et al.: "Design of a Walkthrough System for Indoor Environments from Floor Plans"; Proceedings of the 1998 IEEE Conference on Information Visualization, Jul. 29-31, 1998, pp. 50-57.
Office Action mailed Oct. 18, 2006 (Paper No. 20060925), U.S. Appl. No. 11/204,419, filed Aug. 16, 2005.
Office Action mailed Oct. 19, 2006 (Paper No. 20061012), U.S. Appl. No. 11/204,420, filed Aug. 16, 2005.
Edward J. DeJesus, James P. Callan, and Curtis R. Whitehead, Pearl: An Expert System for Power Supply Layout, 23rd Design Automation Conference, Paper 34.4, IEEE.

* cited by examiner

CAPTURING A USER'S INTENT IN DESIGN SOFTWARE

CROSS-REFERENCE TO RELATED APPLICATIONS

The present invention claims the benefit of priority to U.S. Provisional Patent Application No. 60/602,233, filed on Aug. 17, 2004, entitled "Method and Apparatus for the Selection, Organization and Configuration of Products through Object Oriented Design Intent", the entire contents of which are incorporated by reference herein.

BACKGROUND OF THE INVENTION

1. The Field of the Invention

This invention relates to systems, methods, and computer program products for modeling and design.

2. Background and Relevant Art

As computerized systems have increased in popularity, so has the range of applications that incorporate computational technology. Computational technology now extends across a broad range of applications, including a wide range of productivity and entertainment software. Indeed, computational technology and related software can now be found in a wide range of generic applications that are suited for many environments, as well as fairly industry-specific software.

One such industry that has employed specific types of software and other computational technology increasingly over the past few years is that related to building and/or architectural design. In particular, architects and interior designers (or "designers") use a wide range of design software for designing the aesthetic as well as functional aspects of a given residential or commercial space. In some cases, the designer might use some software programs that might be better suited for exterior design, and then use other software programs that might be better suited for interior design. For example, a designer might implement one software program to design an overall look of a building, and then use the software to design or position each of the functional components of the building, such as weight-bearing walls, trusses in a roof, positioning of electrical outlets, and so on. The designer might then use another software program, whether separately, or as an add-on to the first software program, to design functional walls for offices, design where to place work stations, design the position of desks, chairs, lamps, and so forth.

When designing the exterior and/or interior of a given residential or commercial space, the designer will ordinarily need to take care that each of the elements in the design are structurally sound when built. This is because typical design software allows spaces to be fairly configurable to suit the user's tastes without specific regard in many cases to whether the design will actually work. For example, one typical software design program might allow an architect to design a roof or ceiling that is ill-suited for the number or type of weight-bearing walls the architect has presently drawn. If the roof were actually constructed as designed by the architect, the roof or ceiling might collapse. In a situation such as this, however, the builder might indicate to the architect that the design is physically impossible or impractical, and ask for a redesign. This, of course, can lead to any number of inefficiencies.

Part of the problem with many design software programs that can lead to designing physically impractical structures is the notion that many such design problems require some drawing of a space in flat, two-dimensional space. For example, the outside of a building is designed in a view that emphasizes primarily only height and width, while a top ("plan") view of a building is designed in a view that emphasizes primarily only length and width. With views such as these, the designer will either need to independently visualize the three-dimensional spacing, or will need to perform a separate three-dimensional rendering of the design, if the software allows for it.

In addition, neither the three-dimensional rendering nor the two-dimensional drawing views are designed to accommodate necessary modifications to the objects or walls, based on real-world materials, or other important constraints. For example, a designer might place several L-shaped desks in a work space that are to be arranged back to back against a cubicle wall. In an ordinary environment, positioning the L-shaped desks together might involve a next step of removing a leg where one leg might be shared, or removing a bracket from one of the L-shaped desks for similar reasons. Accordingly, both the two-dimensional views and three-dimensional renderings of conventional design software captures only what is input, and may still need the designer to later add or remove parts in a specific drawing to reflect real-world usage.

Once a design has been finalized by a designer, the designer will need to generate one or more parts lists that are reflective of the various dimensions and parts placed in any of the design views. The parts list will be used for any number of cost estimate or ordering ends. Unfortunately, there is generally not a convenient way for an accurate parts list to be generated automatically from one or more design views. For example, even though a designer might use a conventional design software program to design one or more views of a space, the designer might need to independently deduce a parts list based on each of the different views. In some cases, the designer might hire another person to identify each part, including wood or sheetrock for each wall, as well as the number of brackets or screws needed for each door hinge, desk mount, and the like.

Although there are some software programs that can produce parts lists from a generated view, the parts lists are not always accurate, and do not adequately resolve potential conflicts in designs. For example, in the case where two L-shaped desks will be adjoined in a work space, a conventional parts list that interfaces with the design software will not ordinarily be able to deduce the correct, specific amount of parts needed, such as in the case of shared components. Furthermore, the parts lists that are generated are difficult to read, and usually comprise some detailed information in text, or in a stock keeping unit ("SKU"), and do not readily inform the reader exactly what the image looks like. Thus, conventional, automatically generated parts lists must often be edited in painstaking fashion before they can be submitted to an order fulfillment company.

Accordingly, an advantage in the art can be realized with systems, methods, and computer program products that provide a designer with the ability to design spaces in a highly configurable, and user-friendly manner. In particular, an advantage can be realized with expert systems that are configured to specifically capture a designer's intent in a manner that can emphasize physically possible or practical configurations in at least one aspect.

BRIEF SUMMARY OF THE INVENTION

The present invention solves one or more of the foregoing problems in the prior art with systems, methods, and computer program products configured to automatically represent a user's design choices in an accurate way, and in a way that facilitates efficient building of the design. In particular, implementations of the present invention relate to automatically resolving present and prior user input in concert, and in consideration of real-world values.

For example, one method in accordance with an implementation of the present invention for representing user input through a user interface of a design software program involves receiving an initial user input. For example, the program receives an initial user input to be displayed through a user interface, where the initial user input comprises one or more initial attributes. In general, an attribute will relate to one or more real-world properties, or some other aspect of a design object (e.g., wood, or glass for a design object based on a table). The method also involves receiving a subsequent user input, where the subsequent user input includes one or more subsequent attributes that conflict with the one or more initial attributes. For example, the subsequent user input might regard the inadvertent placement of a chair under a wall. As such, one or more of the initial user input and the subsequent user input are automatically displayed by the user interface of the design software in a modified form, or, alternatively, are automatically hidden from view.

In addition, the method in accordance with the present invention involves receiving a different user input that changes at least one of the one or more initial or subsequent attributes. For example, the user modifies the previously entered initial or subsequent user inputs, and/or a corresponding attribute of the relevant input. In some cases, the additional user modification will result in no effective change to the view through the user interface, such as when the user modification still results in one or more attribute conflicts. Alternatively, if the user modification changes a prior conflict in the initial or subsequent attributes, the design software might then automatically display the initial and subsequent user input as originally received.

Furthermore, a method of generating an accurate parts list in accordance with the present invention involves receiving an initial user input relating to the positioning of an initial material in a design space, the initial material having one or more initial static attributes. The method also involves receiving a subsequent user input relating to the positioning of a subsequent material in the design space, the subsequent material also having one or more subsequent static attributes. The design software then determines one or more possible dynamic attributes of the initial material and the subsequent material based on the any of the initial and subsequent static attributes and on the positioning of the initial and subsequent material. The design software can then display a parts list interface that reflects the one or more static attributes and the determined one or more possible dynamic attributes of the initial and subsequent material.

As such, the design software continually resolves user input automatically, so that the user interface (as well as a parts list) accurately represents user inputs of design choices in real-time, and in accordance with real-world considerations.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and computer program products configured to automatically represent a user's design choices in an accurate way, and in a way that facilitates efficient building of the design. In particular, implementations of the present invention relate to automatically resolving present and prior user input in concert, and in consideration of real-world values.

As will be understood from the present description and claims, one aspect of the invention relates to associating user input with a software object that includes static and dynamic attributes. Another aspect of the invention involves automatically adjusting dynamic attributes in accordance with prior, present, and/or additional user input. Still another aspect of the invention relates to ensuring that user selections accord with real-world values in real-time, such that user input is continually resolved with prior, present, and/or additional user input for an accurate depiction of parts and related positioning in a design space. Still a further aspect of the invention is the continual generation of an accurate parts list along with the user input, which can be displayed in a parts list interface, and does not need further review for correction or additional parts before ordering.

Figure 1A:
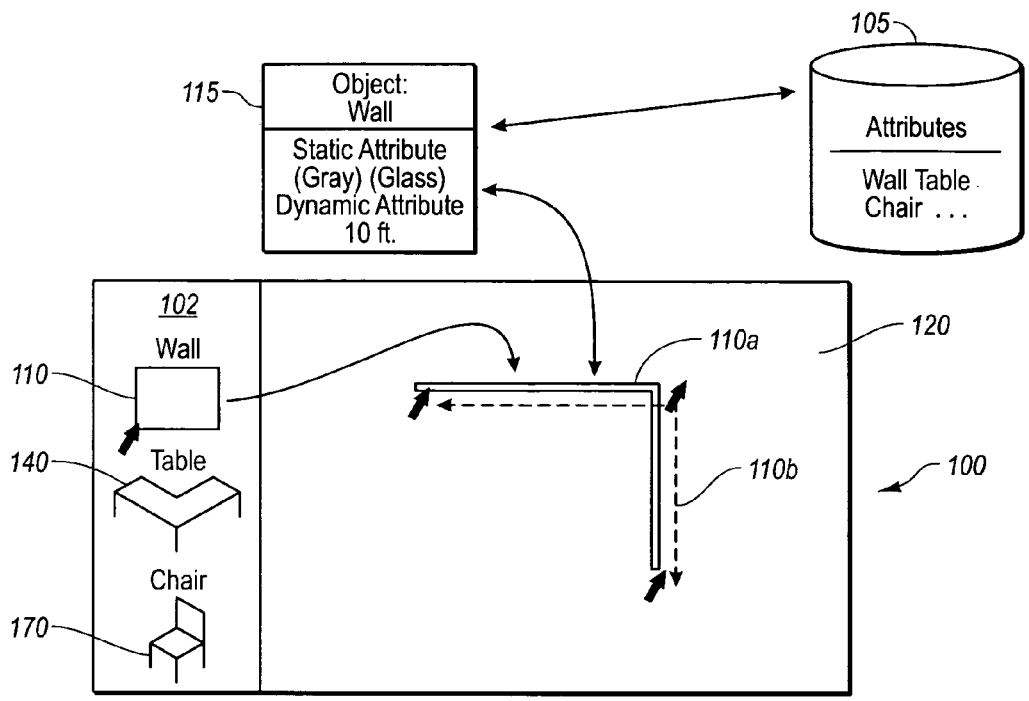
FIG. 1A illustrates a conceptual diagram of a user interface and one or more objects and attributes of a design software program when a user enters input into a design space in accordance with an implementation of the present invention.

For example, FIG. 1A illustrates an exemplary user interface for a design software program in accordance with an implementation of the present invention. As shown, a user is presented in a selection portion 102 with a list of images or icons, such as a wall icon 110, a table icon 140, and a chair icon 170 (and the like), which represent items that can be placed in a design space 120 portion of the user interface 100. In at least one implementation, the image associated with the item (e.g., image of wall 110) in the selection portion 102 indicates the type of the item that will be placed in the design space 120. For example, the wall 110 image may appear to be tinted glass, in which case, if the user selects the wall 110 and draws the wall into the design space, the user will be drawing a tinted glass wall into the design space 120. Thus, the icons 110, 140, 170 etc., provide the user with some initial information about the item that will be drawn on selection.

Of course, the options provided to the user are not limited to the image shown, necessarily. For example, the design software can provide the user with other options (not shown) as part of the design program for modifying the type of wall 110. In particular, the user may be presented with choices to change the wall from tinted glass to a generic cubicle divider wall, a brick wall, a wooden wall, a steel wall, and so forth, which has still additional choices for coloring, texture, thickness, and so forth. This type of flexibility can also be applied to the images and icons shown for the exemplary table icon 140, chair icon 170, and any other icons, items, or the like.

In any event, FIG. 1A shows that the user selects the wall icon 110, and draws a first wall 110a in the design space 120, as well as a second wall 110b. When each of these walls 110a-b are drawn, an object 115 (e.g., object 115 for table 140a) is created, that includes one or more attributes. For example, FIG. 1A shows that object 115 for wall 110a includes a static attribute that the wall is "gray" and made of "glass". These static attributes are pulled from previously coordinated data that has been stored in the attribute store 105, and are thus automatically related when the user selects the wall icon 110. The object 115 also includes a dynamic attribute that indicates that the wall is 10 ft. long.

By contrast, the dynamic attributes of object 115 represent possible variants on the static attribute, and are generated on the fly as the user provides input (i.e., draws a line) in the design space 120. The user can, however, change the static attributes, such as by selecting the wall line 110a, and changing the type of wall that is being used. This can further result in some modification to a dynamic attribute, as will be understood more fully hereinafter.

In general, when the user provides input to the design space 120, the software program resolves the dimensions of the input for real-world values. For example, if the materials of wall 110 (e.g., "gray" "glass") were produced in 4 or 2-foot wide panels, and the user drew an 11-foot wide wall, the design software can automatically adjust the wall 110a width to either 10 or 12 feet as appropriate. The design software might alternately adjust the wall 110a to have six 2-foot panels (12 foot wall), five 2-foot panels (10 foot wall), two 4-foot panels and one or two 2-foot panels (10 or 12 foot wall), and so on. On the other hand, if the user selects another material (e.g., "red" "brick") that is alternatively produced in any of 2 and 3-foot panels, the design software can then readjust to the user's original input to create an 11-foot wide wall 110a. Thus, each of the instantiated objects for an element placed in a design space 120 can be configured to conform to the user's original selection, and thus represent that intent when possible.

As will be understood in greater detail hereinafter, user input also results in the software program resolving the user input to create an accurate parts list interface (e.g., FIGS. 2A-2B). For example, as the user provides input to create wall 110a, the design software creates a default, dynamic parts list of elements (e.g., number of panels based on material in object 115) necessary to create the wall 110a. This dynamic parts list can change in real-time, not only by a user adjustment of the wall width or length, but also by the inclusion of additional elements in the design space 120.

For example, when the user draws wall 110b against wall 110a, the design software can automatically adjust all of the necessary parts for joining walls 110a and 110b, and provide this information in the dynamic parts list. This information can include any necessary floor, ceiling or wall brackets, screws, nails, compounds, or the like, necessary to hold the walls 110a and 110b in place, individually and together, in addition to the other information related to material type. The design software also ensures that a specific type of mounting hardware is used if a specific one is required for the given material. For example, the design software might change the number and type of hardware or compounds used for a wall joint if the user later changes the material of walls 110a and 110b from "gray" "glass" to, for example, "brown" "wood" walls, and so on.

Figure 1B:
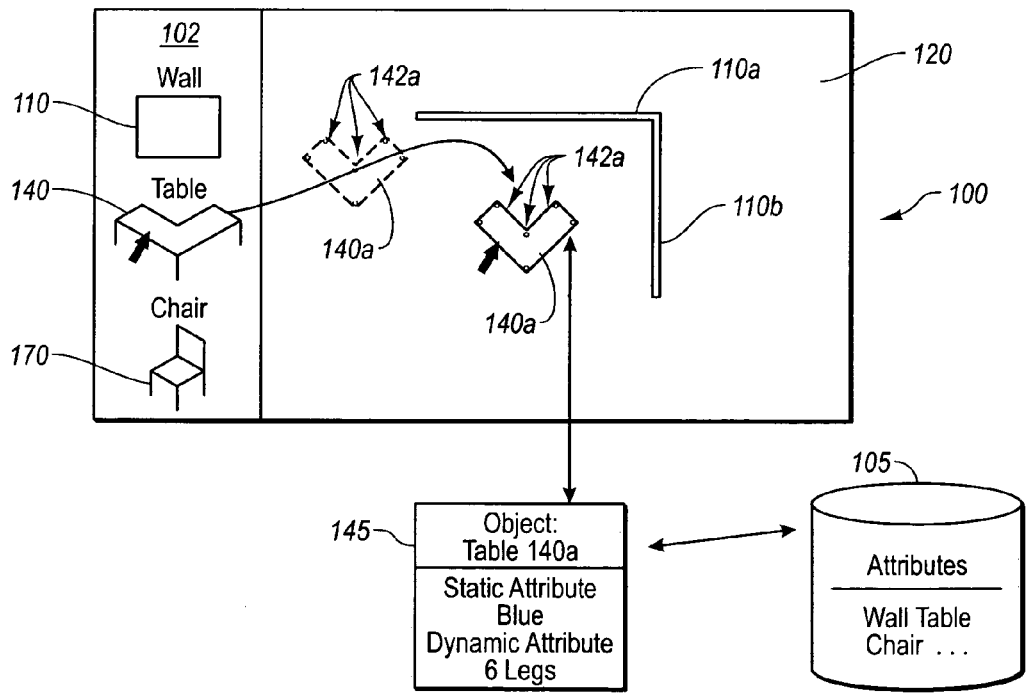
FIG. 1B illustrates a conceptual diagram of the user interface of FIG. 1A and one or more objects and attributes when the user has entered additional input into the design space in accordance with an implementation of the present invention.

In any event, FIG. 1B illustrates a further aspect of FIG. 1A, in which the user next selects subsequent input for the design space 120. In particular, FIG. 1B shows that the user has added table 140a by selecting generic table 140 from the menu 102. FIG. 1B also shows that this user input causes the design software to instantiate an object 145 of table 140a. As with object 115 for wall 110a, object 145 includes one or more static attributes that may be referenced from the attribute store 105, such as that the material selected for table 140a is "blue". Object 145 also includes one or more dynamic attributes, such as X or Y positioning information in the design space 120, as well as, for example, the number of legs, or related mounting hardware. That is, the number of legs 142a can be changed depending on the placement and/or application of table 140a. Accordingly, object 145 shows that table 140a presently includes "6 legs".

Figure 1C:
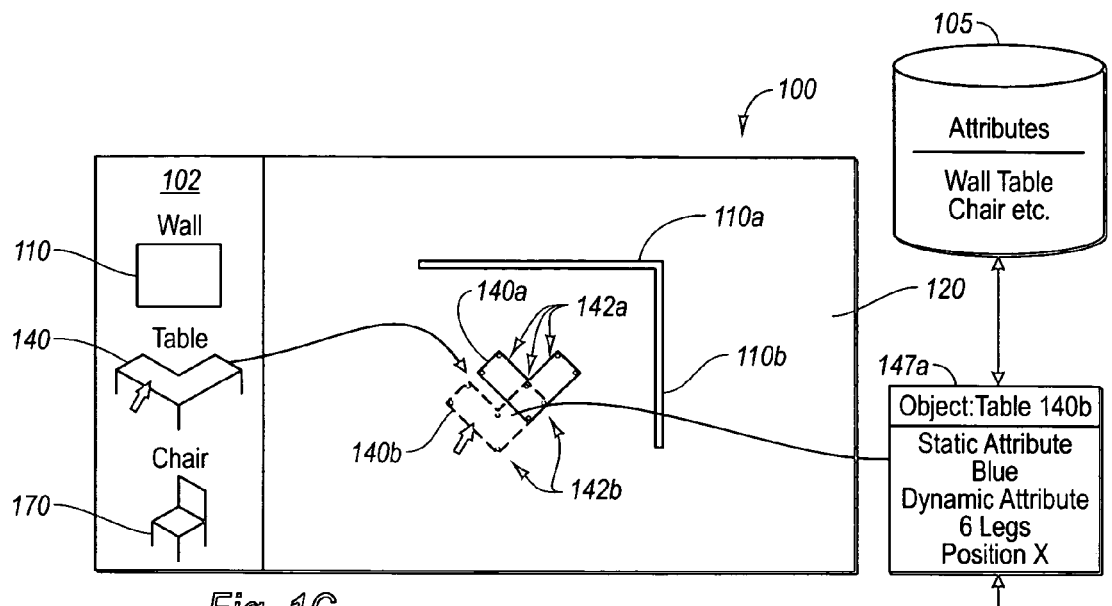
FIG. 1C illustrates a conceptual diagram of the user interface of FIG. 1B and one or more objects and attributes when the user has entered still additional input into the design space in accordance with an implementation of the present invention.

FIG. 1C shows another example of how the images and corresponding objects can change with user input. For example, FIG. 1C shows that a user again selects table 140 in order to create table 140b into the design space 120. When the user initially selects table 140, the design software instantiates an object 147a based on the material shown in the table 140 icon. As with object 145, the user selection causes the design software to reference a number of static attributes from the attribute store 105 and/or one or more dynamic attributes, such as X/Y positioning (i.e., position "X"), the number of legs (i.e., "6 legs"), and so on. In this Figure, however, the user has inadvertently released, or positioned, the table 140b at least partially on top of the initial table 140a. As such, at least one attribute (e.g. a position attribute) of table 140b violates, or conflicts with, an attribute (e.g., a position attribute) of table 140a. As in prior cases, this conflict can result in an additional resolution by the design software that changes this placement, or some other feature or attribute.

Figure 1D:
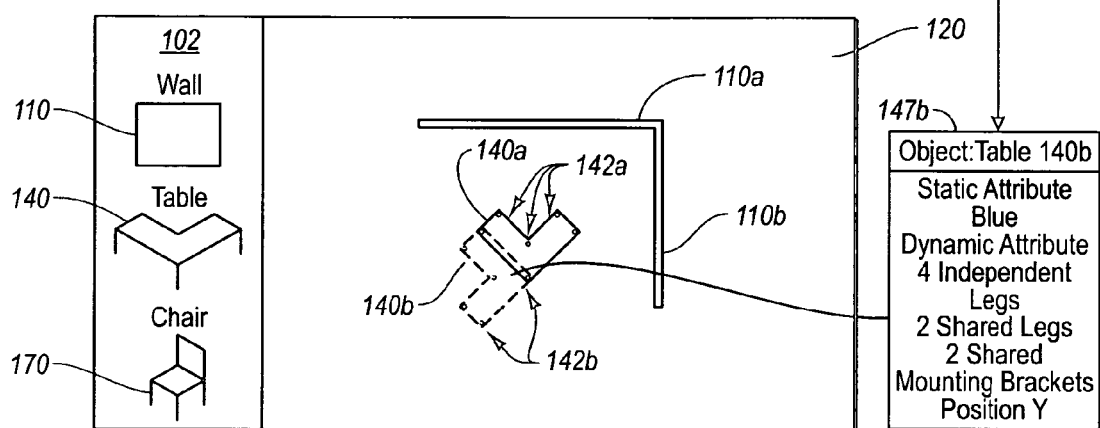
FIG. 1D illustrates a conceptual diagram in accordance with the present invention of the user interface of FIG. 1C and one or more objects and attributes after the design software has resolved the present and prior user input.

For example, FIG. 1D shows that table 140b has been rotated into an appropriate position in FIG. 1C. That is, the design software automatically rotates (or repositions) the table 140b, and places the table near the position of FIG. 1C, albeit in a physically possible conformation (i.e., not on top of table 140a). This is reflected in object 147b, which is an updated version of object 147a, and shows that the position information has changed from position "X" to position "Y". Thus, FIG. 1D shows that the design software automatically determines at least one dynamic attribute of table 140b related to positioning information.

In addition, FIG. 1D also shows that the table 140b has fewer independent legs (e.g., 142b) than shown in FIG. 1C. In particular, the design software automatically determines that the type of material in tables 140a through 140b allow for some component sharing. In some cases, this information of component sharing will have already been indicated in the attribute store 105. The aspect of component sharing, however, did not become relevant in this instance until the design software resolved a position conflict.

As such, FIG. 1D shows that table 140b now has 4 independent legs 142b, and 2 overlapping legs with table 140a, which is reflected in updated object 147b. In particular, object 147b reflects that table 140b has 4 independent legs, 2 shared legs, and 2 mounting brackets for combining the tables 140a and 140b. The design software will also automatically make similar changes for an updated object 145 for table 140a. For example, updated object 115 (not shown) would also show that table 140a also now has 4 independent legs, 2 shared legs, and 2 shared mounting brackets with table 140b.

Figure 1E:
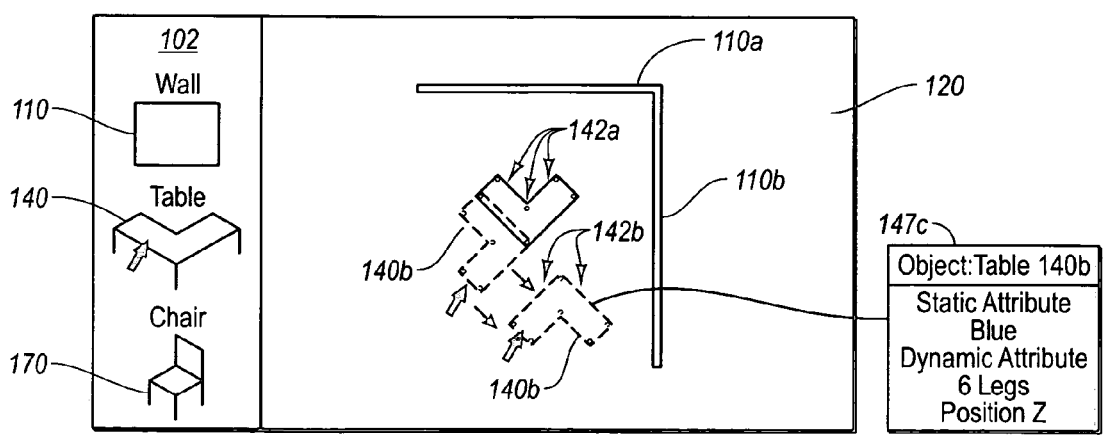
FIG. 1E illustrates a conceptual diagram in accordance with the present invention of the user interface of FIG. 1D and one or more objects and attributes after receiving still additional user input.

These modifications and updates to the object and images shown in the design space 120, however, are not necessarily static, and can be changed on still additional user input. For example, FIG. 1E reflects what can occur when the user moves table 140b from the position shown in FIG. 1D (i.e., position "Y") to an independent position at the lower right portion of the design space 120 (i.e., at position "Z"). In this position, the initial table 140a and subsequent table 140b no longer have conflicting or possibly shared attributes. As such, FIG. 1E shows that the design software automatically updates the object (i.e., object 147c) when table 140b is now in position "Z", such that table 140b again has 6 independent legs 142b. Furthermore, the design software also automatically resolves corresponding changes to table 140a, such as with an updated object (e.g., 145) that indicates table 140a again has 6 independent legs, and that there is also no shared mounting hardware.

Figure 2A:
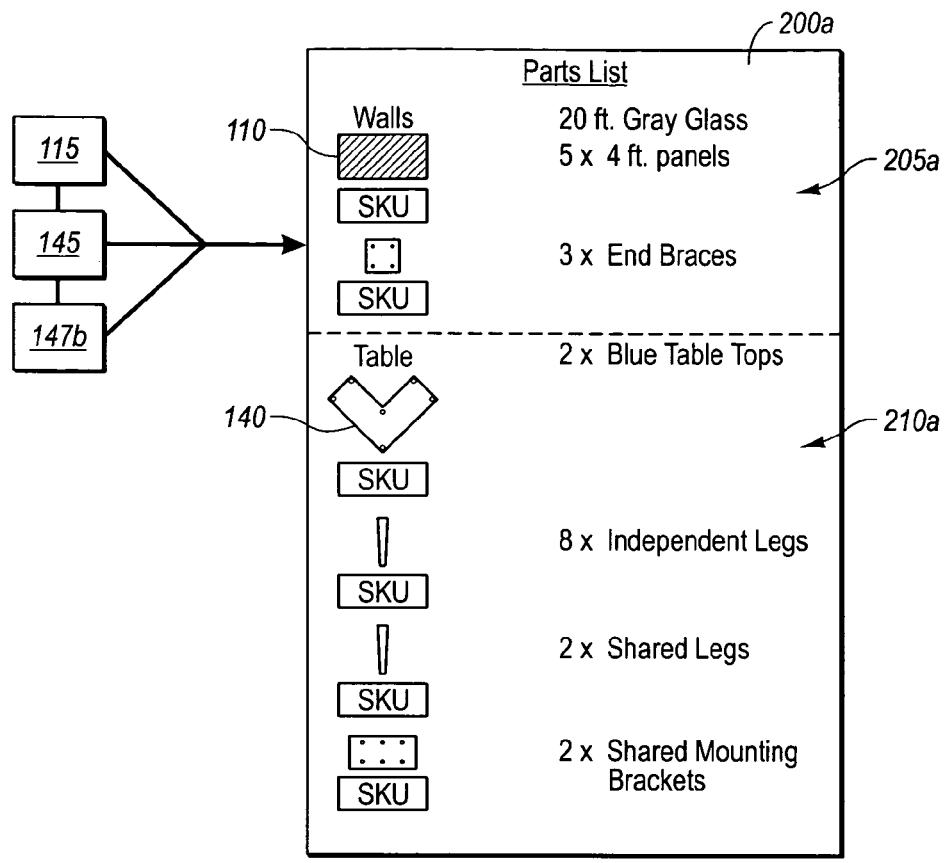
FIG. 2A illustrates a parts list that is generated based on one or more objects in accordance with an implementation of the present invention.
Figure 2B:
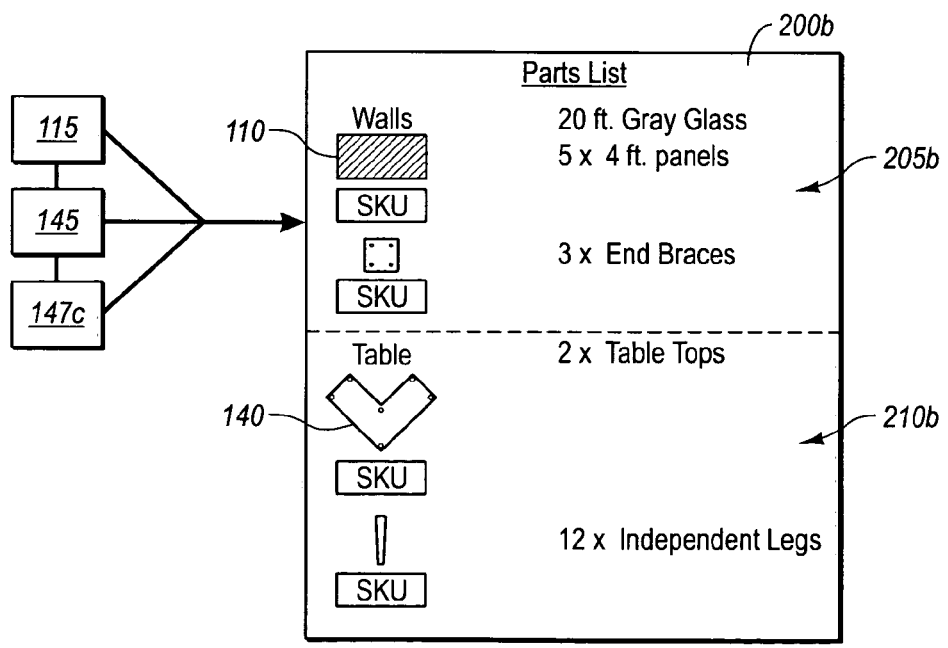
FIG. 2B illustrates the parts list shown in FIG. 2A after one of the one or more objects used to create the parts list has been updated.

FIGS. 2A and 2B illustrate conceptual diagrams of possible parts lists that can be generated based on the foregoing user input, changes to user input, and corresponding resolution by the design software. For example, FIG. 2A shows that, with respect to the scenario of FIG. 1C, the design software uses the then—current data from at least objects 115, 145, and 147b to determine a parts list 200a. In particular, FIG. 2A shows that a parts list 200a based on the generated objects 115, 145, and 147b can include a wall portion 205a that includes the specific parts, the numbers of parts, any appropriate hardware for creating walls 110a and 110b, and all appropriate stock keeping units ("SKUs").

The parts list 200a also includes a table portion 210a, which can also include the specific parts, the numbers of parts, any appropriate hardware for creating tables 140a and 140b, and all appropriate SKUs. For example, parts list 200a shows that the tables 140a and 140b will be built using 8 independent legs, 2 shared legs, and 2 shared mounting brackets, consistent with FIG. 1D. An icon, SKU, description, and amount can be shown for each leg (independent or shared) and appropriate mounting bracket. Although not shown, an automatically updatable (e.g., via an electronic update over a network connection) price for each specific item can also be provided.

By contrast, FIG. 2B shows an updated version of the parts list 200a, or parts list 200b, after the tables 140a and 140b have been moved apart and no longer share components, such as shown in FIG. 1E. In particular, the parts list 200b shows no change from wall portion 205a of list 200a, but a table portion 210b that is different from table portion 210a. For example, parts list 200b shows that the tables 140a and 140b can be created using 2 table tops and 12 independent legs, since there is now no shared material, consistent with the drawings and description of FIG. 1E. Accordingly, FIGS. 2A and 2B show parts lists that include rich information that readily informs the viewer, in an accurate manner, of the contents necessary to build the design in design space 120. (Furthermore, the parts list can be created in a condition to be sent electronically to a fulfillment company over a network.)

FIGS. 2A and 2B also show that the parts lists 200a and 200b include the same icon 110 for the walls and the same icon 140 for the tables that were shown previously in the selection section 102 of the design user interface. In one implementation, the user can click on this icon (e.g., 110) and get more information about the wall material, and, in some cases, can even change the material from the parts list. In some cases, if the user changes the material from the parts list, the design software may even resolve other elements in the design space, and hence other portions or elements of the parts list. That is, a change to one material in the parts list can result in another change to another part in the price list, where appropriate.

For example, supposing the user changed the wall material in the wall portion 205b of parts list 200b so that wall 110a could be made using 2 and 3-foot panels. The design software could then resolve the walls based on the user's original intent of drawing an 11-foot wall 110a, and therefore change the parts list to use three 3-foot panels, and one 2-foot panel. This of course would change the SKUs in the parts list 200b, as well as the depiction of the walls in a corresponding two or three-dimensional view. Similarly, the user could change the table 140 icon in the table portion 210a of the parts list 200a, so that tables 140a and 140b are both round tables.

In such a case, the design software might resolve the attributes so that there are now no shared legs or shared mounting brackets, which would result in a deletion of the shared legs and shared brackets from the price list. If the user were then to click into a two or three-dimensional view, the design space 120 might show a new configuration of the tables in a non-joined fashion. Thus, changes in the parts lists and given design space views are automatically coordinated, resolved and reflected in each other.

The preceding schematic diagrams, therefore, illustrate in part how design software in accordance with the present invention can be configured to automatically and accurately monitor static and dynamic attributes or user input. Furthermore, the preceding diagrams illustrate how the design software can automatically revise a design for real-world values, including continually updating both a user interface and an accurate parts list based on real-world situations.

Additional and alternative descriptions relating to the creation of specific data nodes that can be used in the continual update and/or automatic resolution processes used by the design software are found in commonly-assigned U.S. patent application Ser. No. 11/204,420 now U.S.Pat No. 7,277,830 filed on Aug. 16, 2005 — the same day as the present application, and entitled "Capturing a User's Design Intent with Resolvable Objects". Additional and alternative descriptions for displaying automatically resolved user input in two or more dimensional views as described herein in a realistic manner are found in commonly-assigned U.S. patent application Ser. No. 11/204,419 now U.S. Pat. No. 7,249,005, filed on Aug. 16, 2005— the same day as the present application, and entitled "Design Software Incorporating Efficient 3-D Rendering". The entire contents of the aforementioned patent applications are incorporated by reference herein.

Figure 3:
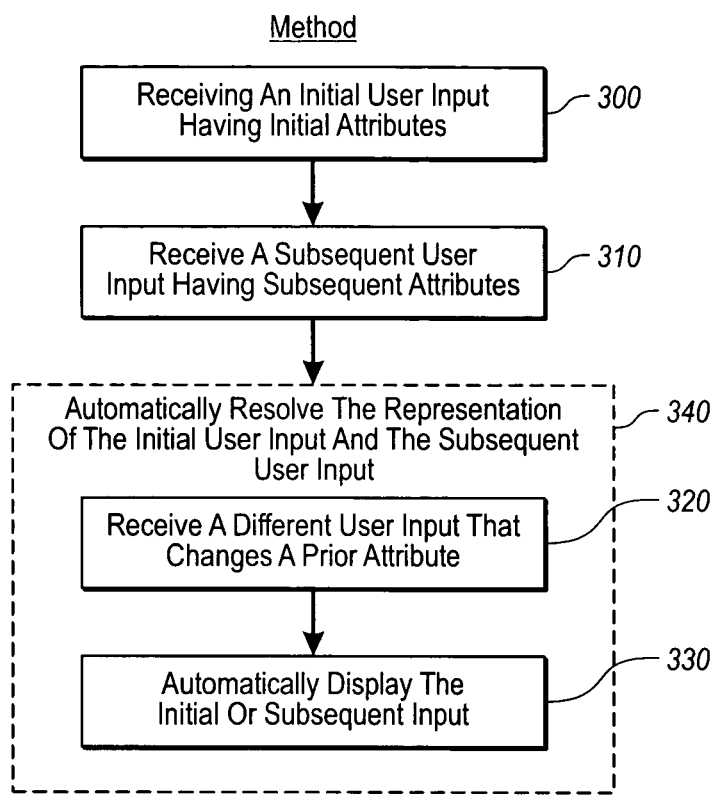
FIG. 3 illustrates a sequence of acts and steps for accomplishing a method in accordance with an implementation of the present invention.

The present invention can also be described in terms of functional steps and non-functional acts for accomplishing a method. In particular, FIG. 3 and the following discussion relate to acts and steps for representing user input in design-oriented software, such that the user input can be correlated with other user input and automatically represented through the user interface in an accurate and efficient manner in real-time. FIG. 3 and the following discussion will be discussed with some reference to FIGS. 1A through 1E. FIG. 3 and the following discussion also includes some reference to "initial" and/or "subsequent" acts. It should be appreciated that these designations are primarily to suggest positions of sequence at some point in a continuum, such that an "initial" act may or may not be a first act in a sequence, but is at least prior to a "subsequent" act. Similarly, a "subsequent" act need only be after an "initial" act at some point, and is therefore not necessarily immediately after an "initial act".

For example, FIG. 3 shows that a method in accordance with the present invention comprises an act 300 of receiving an initial user input having initial attributes. Act 300 includes receiving an initial user input to be displayed through a user interface, the initial user input having one or more initial attributes. For example, a user selects a table that has one or more static attributes related to composition and/or coloring, and then draws a corresponding table 140a in a design space 120. The table 140a can contain one or more additional dynamic attributes that relate to length, width, numbers of legs, or corresponding mounting hardware depending on its position in the design space 120, or its position relative to another item (e.g., wall 110a or 110b).

FIG. 3 also shows that the method comprises an act 310 of receiving a subsequent user input having subsequent attributes. Act 310 includes receiving a subsequent user input having one or more subsequent attributes that conflict with the one or more initial attributes, such that one or more of the initial user input and the subsequent user input are automatically displayed in a modified form or automatically hidden from view. For example, the design software receives a subsequent user input for a table 140b, which the user initially places on top of the previously placed table 140a (e.g., FIG. 1C).

As previously described in FIG. 1C, the input of act 310 can result in some cases in an initial conflict of user input, however, since the design space 120 does not allow for non-real-world situations, and therefore does not allow a table (e.g., table 140b, FIG. 1C) to be placed partially on top of another table (e.g., table 140a, FIG. 1C). Thus, the design software modifies one or more attributes related to positioning, numbers of legs, and mounting hardware, to create an appropriate modified position (or other attribute) for table 140b, as shown in FIG. 1D. That is, where there might be shared hardware, one or more otherwise viewable portions of the item might be hidden from view, since there is no need to show two of the same item in a shared space. In another exemplary case, such as where the user inputs an object such as plant (not shown) to be placed under table 140a, the object that is placed under table 140a may be completely hidden from view until the table 140a is moved or modified in some other way.

In addition, the method of FIG. 3 comprises a step 340 for automatically resolving the representation of the initial user input and the subsequent user input. Step 340 includes automatically resolving the representation of the initial user input and the subsequent user input based on at least one of the one or more initial attributes, the one or more subsequent attributes, and any additional user input, such that at least the initial user input and the subsequent user input are represented through a user interface accurately in real-time. For example, upon recognizing a conflict in positioning between tables 140a and 140b in FIG. 1C, the design software automatically adjusts each of the different attributes of the two tables each time the tables so that they are viewed appropriately in the design interface, and so that there is an accurate parts list maintained.

Accordingly, FIG. 3 shows that step 340 comprises an act 320 of receiving a different user input that changes a prior attribute. Act 320 includes receiving a different user input that changes at least one of the one or more initial or subsequent attributes. For example, a user moves table 140b away from table 140a (i.e., FIG. 1E), such that at least the position attributes of each table no longer conflict in any meaningful way. As such, step 340 also comprises an act 330 of automatically displaying the initial or subsequent input. Act 330 includes automatically displaying the initial or subsequent user input as originally received. For example, the design software automatically reverts at least a portion of the attributes in tables 140a and 140b so that each has the appropriate number of legs and mounting hardware (or lack thereof). Thus, as shown in FIG. 1E, both tables 140a and 140b have the same basic appearance in terms of composition and structure as the table icon 110 selected by the user through the selection portion 102 of the design software interface.

Accordingly, the diagrams and methods provided herein illustrate a number of ways and configurations in which design software can be used to automatically adjust prior, present, and/or future user inputs to create an accurate depiction of a design space. In particular, the design software in accordance with the present invention is configured to continually resolve conflicts in user input, as well as to continually resolve appropriate positioning of input in real-time. Furthermore, the design software in accordance with the present invention accomplishes these ends while maintaining an accurate parts list for each of the items placed in a given design space. Thus, implementations of the present invention represent an effective and efficient means for designing any interior and/or exterior space, and ultimately for constructing the same.

Figure 4:
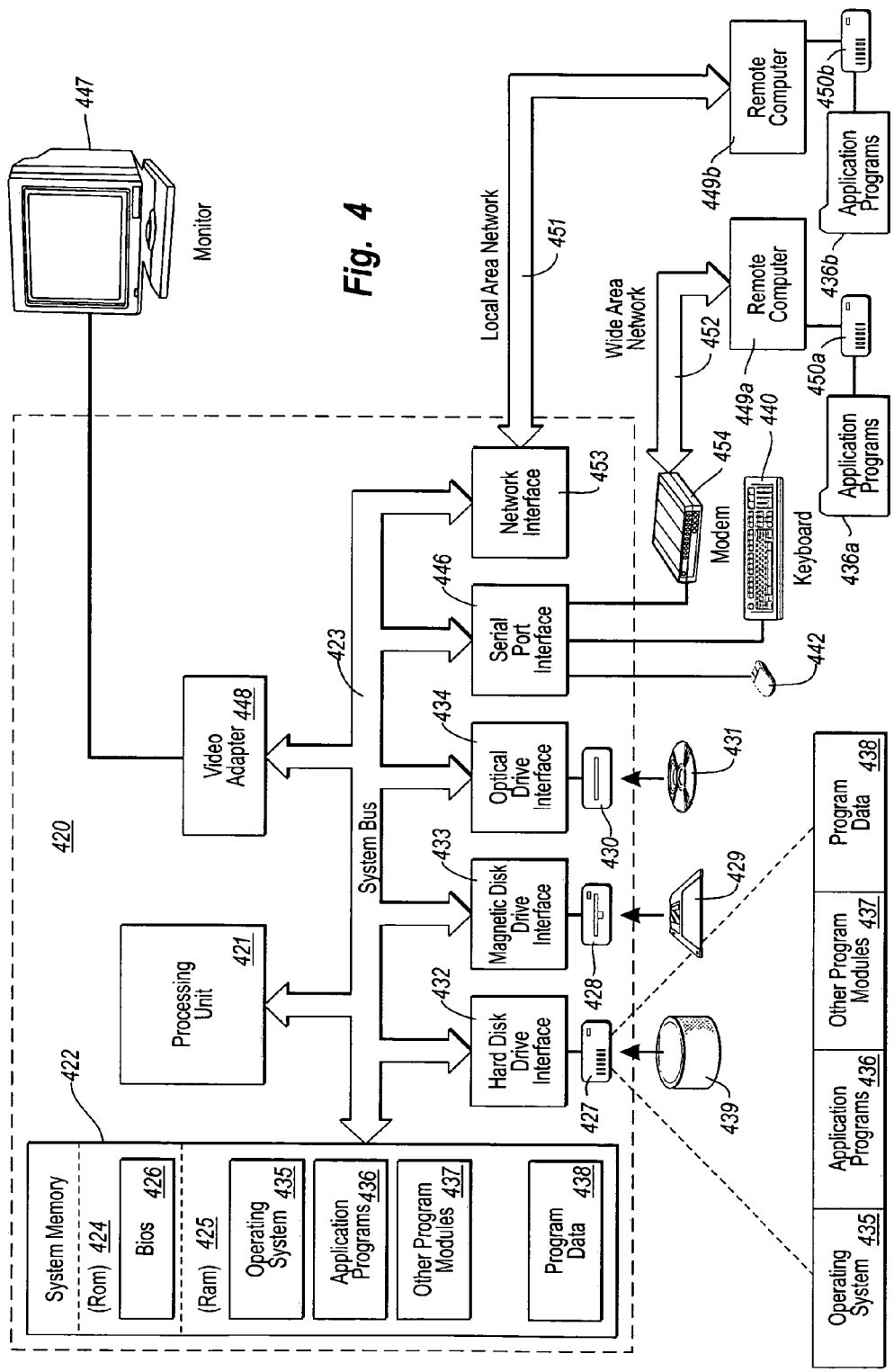
FIG. 4 illustrates a schematic diagram of a suitable computing environment for practicing one or more implementations of the present invention.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

With reference to FIG. 4, an exemplary system for implementing the invention includes a general-purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disc drive 428 for reading from or writing to a removable magnetic disk 429, and an optical disc drive 430 for reading from or writing to removable optical disc 431 such as a CD ROM or other optical media. The magnetic hard disk drive 427, magnetic disk drive 428, and optical disc drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disc 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disc 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A computer-implemented method for generating at a computing system a design for a design space, the computer implemented method comprising:

storing in a memory storage device a plurality of design components which each comprise an object having a plurality of static attributes defining certain physical characteristics of a design component, and one or more dynamic attributes which correspond to one of the static attributes, the dynamic attributes representing possible variants of a static attribute;

instantiating at a display of a computing system a user interface which is comprised of a first portion that serves as a design space, and a second portion which serves as a display of one or more said design components;

selecting a first design element in the second portion of the display, and positioning the selected first design element in the design space at a first designated location of the design space;

selecting a second design element in the second portion of the display, and positioning the second design element in the design space portion of the display at a second designated location of the design space;

one or more processors of the computing system determining that as a result of positioning the second design element at the second designated location, one or more dynamic attributes of the objects for the first and second design components conflict with one another;

the one or more processors of the computing system then processing the conflicting dynamic attributes in a way that resolves the conflict by changing one or more dynamic attributes of at least one of the first and second design components; and the one or more processors generating in the design space a suggested updated design based on the conflict resolution.

2. The computer-implemented method as recited in claim 1, wherein the physical characteristic of said static attributes relate to a fixed property of a material including a composition or color of the material.

3. The computer-implemented method as recited in claim 1, wherein the possible variants of said dynamic attributes relate to a variable property of the material, including one or more of the position, shape, height, length, width, or corresponding accessories used with the material.

4. The computer-implemented method as recited in claim 1, further comprising:
  in response to the suggested updated design displayed in the design space, receiving a different user input based at least in part on the changes to the one or more dynamic attributes resulting from the conflict resolution; and
  the one or more processors generating a further updated design based on the different user input.

5. The computer-implemented method as recited in claim 4, further comprising:
  as to at least one of the first and second design elements, the one or more processors identifying one or more prior static attributes and one or more prior dynamic attributes based on a prior user input; and
  the one or more processors identifying whether the further updated design results in another conflict with any of the one or more prior static attributes or the one or more prior dynamic attributes.

6. The computer-implemented method as recited in claim 5, further comprising the one or more processors generating a parts list corresponding to the suggested updated design, and then generating and updated parts list that corresponds to the further updated design.

7. The computer-implemented method as recited in claim 6, further comprising the one or more processors generating a parts list interface for display.

8. The computer-implemented method as recited in claim 7, wherein the different user input is received through said parts list interface.

9. The computer-implemented method as recited in claim 6, wherein the generated parts list comprises prices corresponding to one or more parts listed.

10. The computer-implemented method as recited in claim 6, further comprising sending over a network to which the computing system is connected, at least one of the suggested updated design and the further updated design, together with a corresponding parts list, to a fulfillment service.

11. A computer program product comprising one or more physical memory devices having stored thereon computer-executable instructions which, when executed at one or more processors of a computing system, cause the computing system to implement a method for generating at the computing system a design for a design space, where the implemented method comprises:
  storing in a memory storage device a plurality of design components which each comprise an object having a plurality of static attributes defining certain physical characteristics of a design component, and one or more dynamic attributes which correspond to one of the static attributes, the dynamic attributes representing possible variants of a static attribute;
  instantiating at a display of a computing system a user interface which is comprised of a first portion that serves as a design space, and a second portion which serves as a display of one or more said design components;
  selecting a first design element in the second portion of the display, and positioning the selected first design element in the design space at a first designated location of the design space;
  selecting a second design element in the second portion of the display, and positioning the second design element in the design space portion of the display at a second designated location of the design space;
  one or more processors of the computing system determining that as a result of positioning the second design element at the second designated location, one or more dynamic attributes of the objects for the first and second design components conflict with one another;
  the one or more processors of the computing system then processing the conflicting dynamic attributes in a way that resolves the conflict by changing one or more dynamic attributes of at least one of the first and second design components; and
  displaying in the design space a suggested updated design based on the conflict resolution.

12. The computer program product as recited in claim 11, wherein the physical characteristic of said static attributes relate to a fixed property of a material including a composition or color of the material.

13. The computer program product as recited in claim 12, wherein the possible variants of said dynamic attributes relate to a variable property of the material, including one or more of the position, shape, height, length, width, or corresponding accessories used with the material.

14. The computer program product as recited in claim 11, further comprising:
  in response to the suggested updated design displayed in the design space, receiving a different user input based at least in part on the changes to the one or more dynamic attributes resulting from the conflict resolution; and
  the one or more processors generating a further updated design based on the different user input.

15. The computer program product as recited in claim 14, further comprising:
  as to at least one of the first and second design elements, the one or more processors identifying one or more prior static attributes and one or more prior dynamic attributes based on a prior user input; and
  the one or more processors identifying whether the further updated design results in another conflict with any of the one or more prior static attributes or the one or more prior dynamic attributes.

16. The computer program product as recited in claim 15, further comprising the one or more processors generating a parts list corresponding to the suggested updated design, and then generating and updated parts list that corresponds to the further updated design.

17. The computer-implemented method as recited in claim 16, further comprising the one or more processors generating a parts list interface for display.

18. The computer program product as recited in claim 17, wherein the different user input is received through said parts list interface.

19. The computer program product as recited in claim 16, wherein the generated parts list comprises prices corresponding to one or more parts listed.

20. The computer program product as recited in claim 16, further comprising sending over a network to which the computing system is connected, at least one of the suggested updated design and the further updated design, together with a corresponding parts list, to a fulfillment service.

21. A computer-implemented method for generating at a computing system a design for a design space, the computer implemented method comprising:
    storing in a memory storage device a plurality of design components which each comprise an object having a plurality of static attributes defining certain physical characteristics of a design component, and one or more dynamic attributes which correspond to one of the static attributes, the dynamic attributes representing possible variants of a static attribute;
    instantiating at a display of a computing system a user interface which is comprised of a first portion that serves as a design space, and a second portion which serves as a display of one or more said design components;
    selecting a first design element in the second portion of the display, and positioning the selected first design element in the design space at a first designated location of the design space;
    one or more processors of the computing system then generating a parts list based on the object for the first design component, the parts list at least identifying appropriate hardware and stock keeping units required for physical implementation of the first design component at the first designated location of the design space;
    selecting a second design element in the second portion of the display, and positioning the second design element in the design space portion of the display at a second designated location of the design space;
    one or more processors of the computing system determining that as a result of positioning the second design element at the second designated location, one or more dynamic attributes of the objects for the first and second design components conflict with one another;
    the one or more processors of the computing system then processing the conflicting dynamic attributes in a way that resolves the conflict by changing one or more dynamic attributes of at least one of the first and second design components, and displaying in the design space a suggested updated design based on the conflict resolution; and
    using the objects for each of the first and second design components, where at least one of the objects has one or more dynamic attributes changed as a result of the conflict resolution, the one or more processors of the computing system then generating a new parts list identifying appropriate hardware and stock keeping units required for physical implementation of the first and second design component as represented in the suggested updated design of the design space.

22. The computer-implemented method as recited in claim 21, wherein the physical characteristic of said static attributes relate to a fixed property of a material including a composition or color of the material.

23. The computer-implemented method as recited in claim 21, wherein the possible variants of said dynamic attributes relate to a variable property of the material, including one or more of the position, shape, height, length, width, or corresponding accessories used with the material.

24. The computer-implemented method as recited in claim 21, further comprising:
    in response to the suggested updated design displayed in the design space, receiving a different user input based at least in part on the changes to the one or more dynamic attributes resulting from the conflict resolution; and
    the one or more processors generating a further updated design based on the different user input.

25. The computer-implemented method as recited in claim 24, further comprising:
    as to at least one of the first and second design elements, the one or more processors identifying one or more prior static attributes and one or more prior dynamic attributes based on a prior user input; and
    the one or more processors identifying whether the further updated design results in another conflict with any of the one or more prior static attributes or the one or more prior dynamic attributes.

26. The computer-implemented method as recited in claim 25, further comprising the one or more processors generating an updated parts list that corresponds to the further updated design.

27. The computer-implemented method as recited in claim 26, further comprising the one or more processors generating a parts list interface for display.

28. The computer-implemented method as recited in claim 27, wherein the different user input is received through said parts list interface.

29. The computer-implemented method as recited in claim 21, wherein the generated parts list comprises prices corresponding to one or more parts listed.

30. The computer-implemented method as recited in claim 26, further comprising sending over a network to which the computing system is connected, at least one of the suggested updated design and the further updated design, together with a corresponding parts list, to a fulfillment service.

31. A computer program product comprising one or more physical memory devices having stored thereon computer-executable instructions which, when executed at one or more processors of a computing system, cause the computing system to implement a method for generating at the computing system a design for a design space, where the implemented method comprises:
    storing in a memory storage device a plurality of design components which each comprise an object having a plurality of static attributes defining certain physical characteristics of a design component, and one or more dynamic attributes which correspond to one of the static attributes, the dynamic attributes representing possible variants of a static attribute;
    instantiating at a display of a computing system a user interface which is comprised of a first portion that serves as a design space, and a second portion which serves as a display of one or more said design components;
    selecting a first design element in the second portion of the display, and positioning the selected first design element in the design space at a first designated location of the design space;
    one or more processors of the computing system then generating a parts list based on the object for the first design component, the parts list at least identifying appropriate hardware and stock keeping units required for physical implementation of the first design component at the first designated location of the design space;
    selecting a second design element in the second portion of the display, and positioning the second design element in the design space portion of the display at a second designated location of the design space;
    one or more processors of the computing system determining that as a result of positioning the second design element at the second designated location, one or more dynamic attributes of the objects for the first and second design components conflict with one another;
    the one or more processors of the computing system then processing the conflicting dynamic attributes in a way that resolves the conflict by changing one or more dynamic attributes of at least one of the first and second design components, and displaying in the design space a suggested updated design based on the conflict resolution; and using the objects for each of the first and second design components, where at least one of the objects has one or more dynamic attributes changed as a result of the conflict resolution, the one or more processors of the computing system then generating a new parts list identifying appropriate hardware and stock keeping units required for physical implementation of the first and second design component as represented in the suggested updated design of the design space.

32. The computer program product as recited in claim 31, wherein the physical characteristic of said static attributes relate to a fixed property of a material including a composition or color of the material.

33. The computer program product as recited in claim 32, wherein the possible variants of said dynamic attributes relate to a variable property of the material, including one or more of the position, shape, height, length, width, or corresponding accessories used with the material.

34. The computer program product as recited in claim 31, further comprising:

in response to the suggested updated design displayed in the design space, receiving a different user input based at least in part on the changes to the one or more dynamic attributes resulting from the conflict resolution; and the one or more processors generating a further updated design based on the different user input.

35. The computer program product as recited in claim 34, further comprising:

as to at least one of the first and second design elements, the one or more processors identifying one or more prior static attributes and one or more prior dynamic attributes based on a prior user input; and the one or more processors identifying whether the further updated design results in another conflict with any of the one or more prior static attributes or the one or more prior dynamic attributes.

36. The computer program product as recited in claim 35, further comprising the one or more processors generating an updated parts list that corresponds to the further updated design.

37. The computer-implemented method as recited in claim 36, further comprising the one or more processors generating a parts list interface for display.

38. The computer program product as recited in claim 37, wherein the different user input is received through said parts list interface.

39. The computer program product as recited in claim 31, wherein the generated parts list comprises prices corresponding to one or more parts listed.

40. The computer program product as recited in claim 36, further comprising sending over a network to which the computing system is connected, at least one of the suggested updated design and the further updated design, together with a corresponding parts list, to a fulfillment service.

* * * * *